United States Patent
Snodgrass et al.

(10) Patent No.: US 10,907,824 B2
(45) Date of Patent: Feb. 2, 2021

(54) STAGED COOLING FLOW NOZZLE VALVE

(75) Inventors: Brett Jay Snodgrass, Byron, IL (US); Charlie Carson, Grand Rapids, MI (US); Carthel C. Baker, Oregon, IL (US); Michael P. Garry, Rockford, IL (US)

(73) Assignee: Woodward, Inc., Fort Collins, CO (US)

( * ) Notice: Subject to any disclaimer, the term of this patent is extended or adjusted under 35 U.S.C. 154(b) by 2522 days.

(21) Appl. No.: 13/588,355

(22) Filed: Aug. 17, 2012

(65) Prior Publication Data

US 2013/0043331 A1  Feb. 21, 2013

Related U.S. Application Data

(60) Provisional application No. 61/525,313, filed on Aug. 19, 2011.

(51) Int. Cl.
*F23R 3/34* (2006.01)
*F23D 11/38* (2006.01)
*F02C 7/232* (2006.01)

(52) U.S. Cl.
CPC .............. *F23D 11/38* (2013.01); *F02C 7/232* (2013.01); *F23R 3/343* (2013.01); *F23R 2900/00004* (2013.01)

(58) Field of Classification Search
CPC .......... F02C 7/232; F23D 11/38; F23R 3/343; F23R 3900/00004; F23K 5/147; B05B 1/3046; B05B 1/12; B05B 9/01; B05B 1/3006; B05B 1/3026; Y10T 137/2663; F02M 51/06
See application file for complete search history.

(56) References Cited

U.S. PATENT DOCUMENTS

| | | | | | |
|---|---|---|---|---|---|
| 3,141,298 A | * | 7/1964 | May | ............... | F02C 7/08 60/241 |
| 4,027,474 A | * | 6/1977 | Demase | ............... | F02C 7/228 60/39.281 |
| 4,164,962 A | * | 8/1979 | Soderberg | ............... | F02C 7/228 137/625.3 |
| 4,491,272 A | * | 1/1985 | Bradley | ............... | F23D 11/26 239/104 |
| 4,640,308 A | * | 2/1987 | Toelle | ............... | F02C 9/263 137/596.1 |

(Continued)

OTHER PUBLICATIONS

U.S. Appl. No. 13/588,767, filed Aug. 17, 2012, Snodgrass et al.

*Primary Examiner* — Todd E Manahan
*Assistant Examiner* — Thuyhang N Nguyen
(74) *Attorney, Agent, or Firm* — Reinhart Boerner Van Deuren P.C.

(57) ABSTRACT

A fuel split control arrangement is provided. The arrangement includes a staged cooling flow control valve and cooling check valve. The staged cooling flow control valve and cooling check valve is connected between the primary and secondary tips of a nozzle in a turbine engine. The staged cooling flow control valve and cooling check valve includes a valve member arrangement operable to prevent fuel flow from the secondary fuel supply manifold to the secondary tip and simultaneously allow fuel flow from the secondary fuel supply manifold to the primary tip such that the primary tip receives fuel flow from both the secondary fuel supply manifold and the primary fuel supply manifold.

21 Claims, 7 Drawing Sheets

(56) References Cited

U.S. PATENT DOCUMENTS

| | | | |
|---|---|---|---|
| 5,301,714 A * | 4/1994 | Johnson | B05B 1/306 |
| | | | 137/563 |
| 5,321,949 A | 6/1994 | Napoli et al. | |
| 5,406,798 A * | 4/1995 | Wiesner, Jr. | F02C 7/12 |
| | | | 137/339 |
| 5,448,882 A | 9/1995 | Dyer et al. | |
| 5,778,925 A * | 7/1998 | Cooke | F02M 55/02 |
| | | | 123/467 |
| 6,955,040 B1 | 10/2005 | Myers, Jr. et al. | |
| 7,007,476 B2 | 3/2006 | Mains et al. | |
| 7,036,302 B2 | 5/2006 | Myers, Jr. et al. | |
| 7,386,981 B2 | 6/2008 | Zielinski et al. | |
| 2003/0093998 A1 | 5/2003 | Michau et al. | |
| 2005/0198964 A1 | 9/2005 | Myers, Jr. et al. | |
| 2009/0173810 A1 | 7/2009 | Rodrigues et al. | |

\* cited by examiner

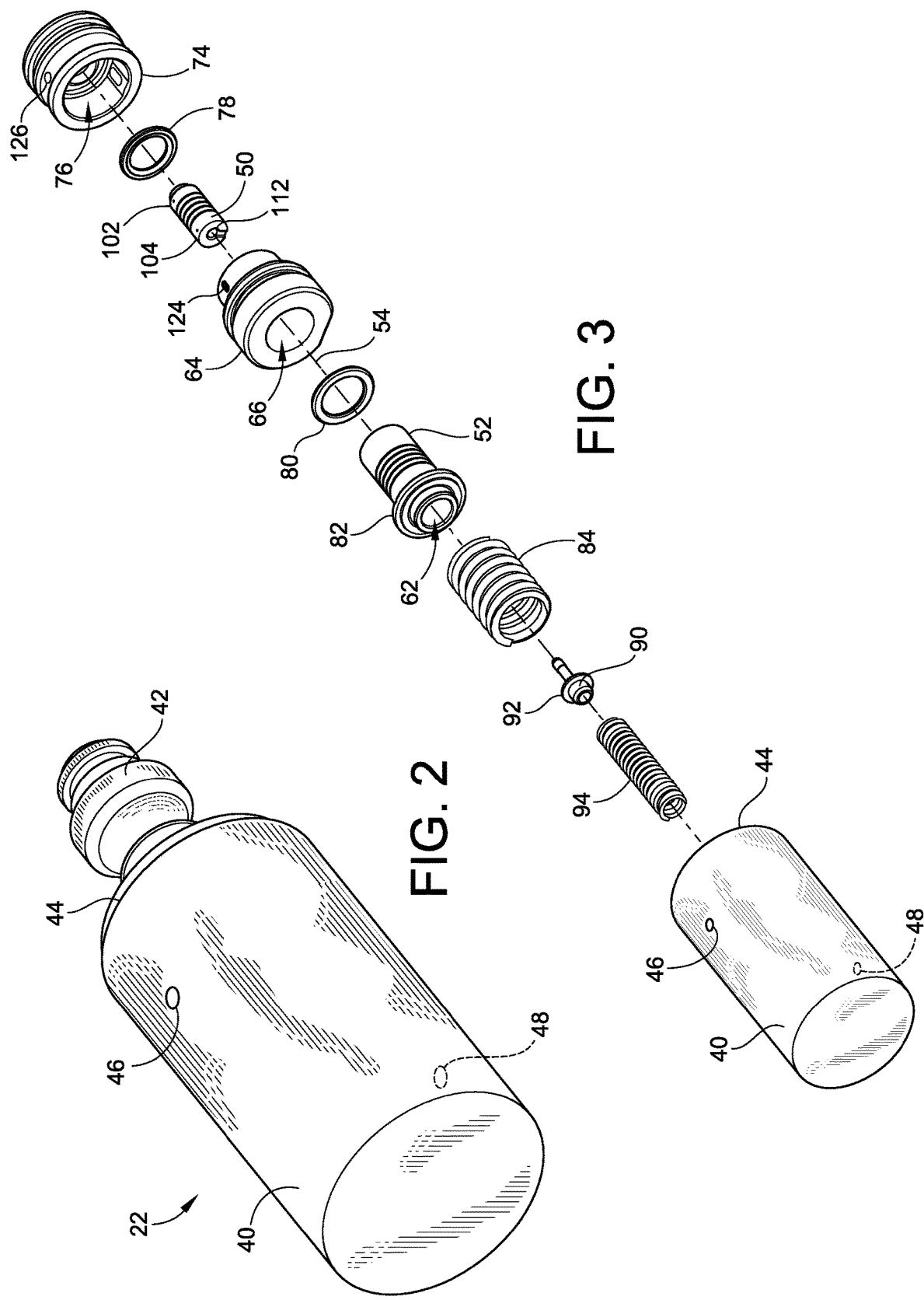

STAGED COOLING FLOW NOZZLE VALVE

This patent application claims the benefit of U.S. Provisional Patent Application No. 61/525,313, filed Aug. 19, 2011, the entire teachings and disclosure of which are incorporated herein by reference thereto.

BACKGROUND OF THE INVENTION

Field of the Invention

Contemporary turbine engines typically incorporate a fuel injection system that includes one or more nozzles for delivering fuel for combustion. Each nozzle typically includes a primary tip and a secondary tip, with each tip providing a different fuel dispersion characteristic than the other. The primary and secondary tips can be used together or independently of one another to ultimately control a desired total fuel dispersion into a combustion chamber to control combustion characteristics. In such a configuration, the primary tip receives fuel from a primary manifold, and the secondary tip receives fuel from a secondary manifold.

Contemporary turbine engines including the aforementioned nozzles also typically incorporate a control system for governing the split of the fuel, i.e. governing the flow of fuel to the primary tips from the primary manifold and governing the flow of fuel to the secondary tips from the secondary manifold. Such control is difficult due to a variety of constraints, including but not limited to, the need for cooling flow, i.e. pass through flow from the secondary manifold to the primary tip when the secondary tip is in a closed condition.

Without such cooling flow, fuel in the secondary manifold will become stagnant, as it cannot flow through secondary tips due to their closed condition. Fuel stagnation can lead to coking in the secondary manifold, a condition that is aggressively avoided in turbine applications.

Unfortunately, contemporary control systems for governing the split of fuel that also provide cooling flow to avoid the aforementioned problem of fuel stagnation are relatively complex. Such systems typically incorporate two separate control valve assemblies within each nozzle. Such control valve assemblies are difficult to control, expensive, heavy, and they do not provide variable flow split capability. Instead, such dual valve assembly systems provide only several known discrete flow split levels, that may not be suitable for certain operating conditions. As such, there is a need in the art for a low complexity, low weight, low cost control solution that also presents variable flow split capability.

The invention provides such a solution. These and other advantages of the invention, as well as additional inventive features, will be apparent from the description of the invention provided herein.

BRIEF SUMMARY OF THE INVENTION

In one aspect, a control valve for regulating fuel flow between a primary tip and a secondary tip of an injection nozzle is provided. An embodiment of the control valve according to this aspect includes an inlet flow path, a primary flow path operably coupled to the inlet flow path, and a secondary flow path operably coupled to the inlet flow path and the primary flow path. A first valve member is movable to selectively open and close a passage between the inlet flow path and the secondary flow path. A second valve member is movable to selectively open and close a passage between the inlet flow path and the primary flow path.

In a certain embodiment, the control valve further includes a housing having an internal cavity and an inlet in fluid communication with the inlet flow path. The housing also includes a secondary tip port in fluid communication with the secondary flow path, and a primary tip port in fluid communication with the primary flow port. Each of the inlet flow port, the secondary tip port, and the primary flow port are in fluid communication with the cavity. The secondary tip port and the primary tip port are each in fluid communication with the cavity. The first valve member has an internal bore that is slidably disposed within the cavity and movable to selectively open and close a flow path between the inlet and the secondary tip port. The second valve member is slidably disposed within the internal bore of the first valve member. The second valve member is movable to selectively open and close a flow path between the inlet and the primary tip port.

In one embodiment, the second valve member is movable relative to the first valve member and the housing to open the flow path between the inlet and the primary tip port when the flow path between the inlet and the secondary tip port is closed. In a subsidiary embodiment, the first and second valve members are movable relative to the housing in a same axial direction to open the flow path between the inlet and the secondary tip port, and close the flow path between the inlet and the primary tip port.

In certain embodiments, the control valve further includes a stem extending into the internal bore of the first valve member and extending into abutted contact with the second valve member. The stem includes a radially outwardly extending flange. The first valve member includes a radially inwardly extending flange within the internal bore thereof. The radially inwardly extending flange has first and second surfaces in an axially opposed spaced relationship. The first surface faces the radially outwardly extending flange of the stem. A subsidiary embodiment, the second valve member has a high pressure closed position wherein the flow path between the inlet and the primary tip port is closed, and the second valve member is in abutted contact with the stem. The radially outwardly extending flange of the stem is spaced away from the first surface of the radially inwardly extending flange. In another subsidiary embodiment, the second valve member has a low pressure closed position wherein the flow path between the inlet and the primary tip port is closed, and the second valve member is spaced away from a terminal end of the stem. The stem is in abutted contact with the first surface.

In certain embodiments, the second valve member includes first and second radial ports connected by a common passageway. The first radial port is closed by the first valve member when the second valve member moves in a first direction relative to the first valve member. The second radial port is closed by the first valve member when the second valve member moves in a second direction opposite the first direction.

In certain embodiments, the control valve further includes a sleeve surrounding the first and second valve members and including a radial port aligned with the secondary tip port. In a subsidiary embodiment, the sleeve and first valve member each commonly seal with a first axial face seal. The first valve member is movable out of sealing engagement with the first axial face seal.

In certain embodiments, the first and second valve members are centered along a common centerline. In a subsidiary embodiment, the first valve member selectively opens and closes a flow path between the inlet and the secondary tip port by way of an axial seal. The second valve member selectively opens and closes a flow path between the inlet and the primary tip port by way of a radial seal.

In another aspect, a staged cooling flow control valve for regulating fuel flow between a primary tip and a secondary tip of an injection nozzle is provided. An embodiment of the staged cooling flow control valve according to this aspect includes a housing having an internal cavity and an inlet. The housing also includes a secondary tip port and a primary tip port in fluid communication with the cavity. A first valve member is disposed within the cavity and movable to selectively open a flow path between the inlet and the secondary tip port at a first pressure differential between the inlet and the primary tip port. A second valve member is disposed within the cavity and movable to selectively open a flow path between the inlet and the primary tip port at a second pressure differential between the inlet and the primary tip port. The second pressure differential is less than the first pressure differential.

In certain embodiments, the second valve member is movable in a first direction to selectively close the flow path between the inlet and the primary tip port at a third pressure differential between the inlet and the primary tip port. The third pressure differential is less than the first and second pressure differentials. In a subsidiary embodiment, the first and second valve members move in a second direction to open the flow path between the inlet and the secondary tip port and close the flow path between the inlet and the primary tip port at the first pressure differential. The second direction is opposite the first direction.

In another subsidiary embodiment, movement of the first valve member in the first direction is resisted by a first and a second biasing spring. The first biasing spring is operably connected between an interior wall of the housing and the first valve member. The second biasing spring is operably connected between the interior wall of the housing and the second valve member.

In another aspect, a nozzle of a fuel injection system is provided. An embodiment of a nozzle according to this aspect includes a secondary tip in fluid communication with a secondary fuel supply manifold. The nozzle also includes a primary tip in fluid communication with a primary fuel supply manifold. The nozzle also includes a staged cooling flow control valve connected between the secondary tip and the primary tip. The staged cooling flow control valve has an inlet connected to the secondary fuel supply manifold. The staged cooling flow control valve includes a valve member arrangement operable to prevent fluid flow from the secondary fuel supply manifold to the secondary tip and simultaneously allow fuel flow from the secondary fuel supply manifold to the primary tip such that the primary tip receives fuel flow from both the secondary fuel supply manifold and the primary fuel supply manifold.

In certain embodiments, the valve arrangement is movable within a housing of the staged cooling flow control valve to prevent fluid flow from the secondary fuel supply manifold through the inlet to the primary tip, and allow fluid flow from the secondary fuel supply manifold through the inlet to the secondary tip.

In certain embodiments, the valve arrangement is movable within a housing of the staged cooling flow control valve to prevent fluid flow from the secondary fuel supply manifold through the inlet to the secondary tip and the primary tip simultaneously.

In certain embodiments, the valve member arrangement is movable within a housing the staged cooling flow control valve to allow fluid flow from the secondary fuel supply manifold through the inlet to the primary fuel supply manifold and prevent fluid flow from the secondary fuel supply manifold through the inlet to the secondary tip simultaneously.

In another aspect, a cooling check valve for regulating fuel flow between a primary tip and a secondary tip of an injection nozzle is provided. An embodiment of the cooling check valve according to this aspect includes an inlet flow path, a primary flow path operably coupled to the inlet flow path, and a secondary flow path operably coupled to the inlet flow path and the primary flow path. The cooling check valve also includes a metering valve movable to selectively open a passage between the inlet flow path and the secondary flow path when a first pressure is greater in the inlet flow path than a second pressure in the primary flow path. The cooling check valve also includes a cooling check valve member movable to selectively open a passage between the inlet flow path and the primary flow path when the second pressure is greater than the first pressure.

In a certain aspect, the cooling check valve further includes a housing having an internal cavity and an inlet port in fluid communication with the inlet flow path. The housing also includes a secondary tip port in fluid communication with the secondary flow path, and a primary tip port in fluid communication with the primary tip port. Each of the secondary tip port, the primary tip port and the inlet port are in fluid communication with the cavity. The metering valve member is disposed within the cavity and movable to selectively open a flow path between the inlet port and the secondary tip port when a first pressure is greater than a second pressure. The cooling valve member is disposed within the cavity and movable to selectively open a flow path between the inlet port and the primary tip port when the second pressure is greater than the first pressure.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 2 is a perspective view of the split flow control valve schematically shown at FIG. 1;

FIG. 3 is a perspective exploded view of the split flow control valve of FIG. 2.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Turning now to the drawings, an exemplary embodiment of a staged cooling flow nozzle valve (SCF valve) or a cooling check valve (CCV) is illustrated across the several views. The CCV and the SCF valve overcome existing problems in the art by providing for variable fuel flow split with a single valve as opposed to discrete fuel flow split levels using multiple complex valve assemblies.

Figure 1:
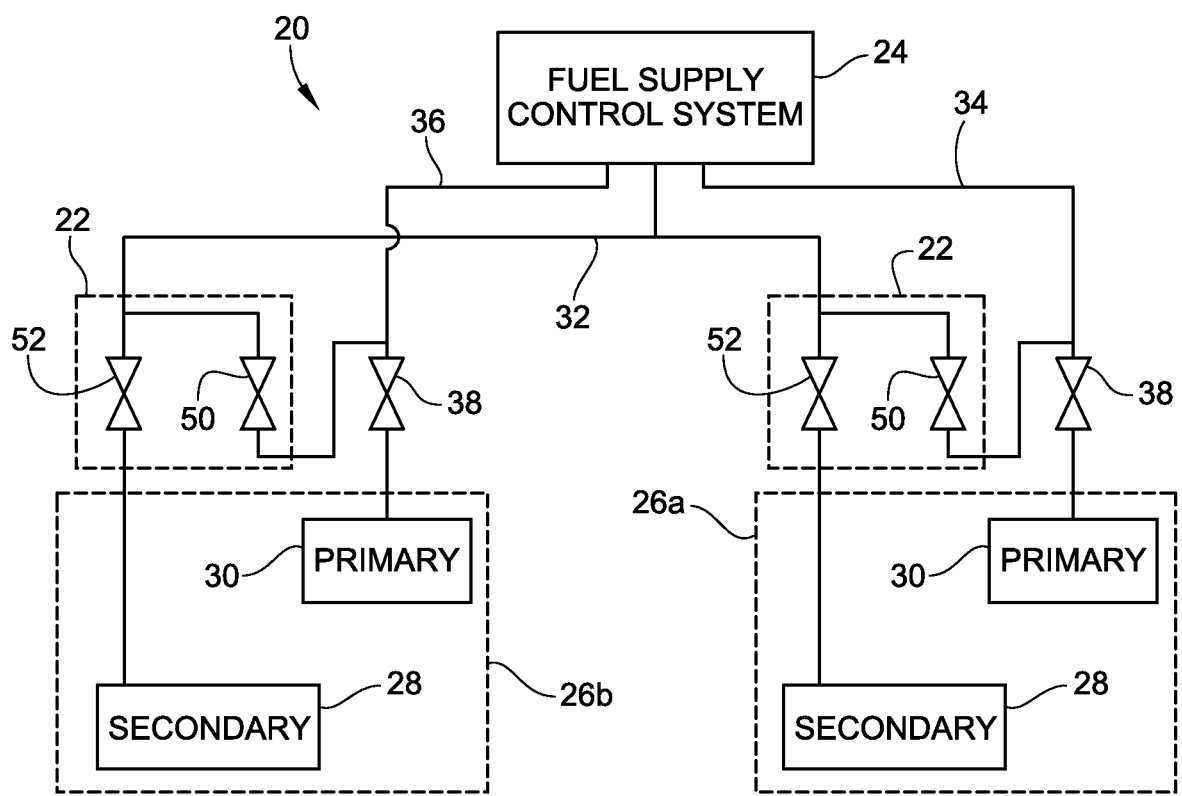
FIG. 1 is a schematic illustration of a fuel injection system incorporating an exemplary embodiment of a split flow control valve according to the teachings of the present invention.

With particular reference to FIG. 1, a schematic illustration of a fuel injection system 20 incorporating either the SCF valve 22 or CCV 222 (see FIG. 7) is illustrated. The fuel injection system 20 includes a fuel supply control system 24. In the interest of brevity, only the SCF valve 22 will be discussed in reference to FIG. 1; however, the CCV 222 discussed later regarding FIGS. 7-8 could also be substituted.

Regarding FIG. 1, an enriched nozzle assembly 26a is coupled to the fuel supply control system 24 and receives metered fuel flow therefrom. The enriched nozzle assembly 26a includes a secondary flow path in fluid communication with a secondary tip 28 and a primary flow path in fluid communication with a primary tip 30. The secondary tip 28 and primary tip 30 are capable of independent fuel supply to a combustion chamber. The secondary and primary tips 28, 30 supply fuel to the combustion chamber simultaneously, or exclusively of one another depending upon operating conditions.

The secondary tip 28 receives metered fuel flow from a secondary manifold 32 connected to the fuel supply control system 24. The SCF control valve 22 is operable to meter the fuel flow through the secondary manifold 32 to the secondary tip 28. The primary tip 30 receives metered fuel flow from the fuel supply control system 24 via an enriched primary manifold 34. A primary metering valve 38 is responsible for metering flow through the enriched primary manifold 34 to the primary tip 30.

The SCF control valve 22 is schematically represented as including two separate valve members arranged in a parallel configuration. These valve members are referred to herein respectively as a cooling valve member 50 and a metering valve member 52 which together form a valve member arrangement for providing the variable fuel flow split to achieve the aforementioned cooling flow functionality. More specifically, in instances where the metering valve member 52 is entirely closed and thus fuel flow from the secondary manifold 32 to the secondary tip 28 is prevented, the cooling valve member 50 can remain in an open configuration to allow pass through flow from the secondary manifold 32 through the cooling valve member 50 and to the enriched primary manifold 34. Such pass through flow is ultimately metered through the primary metering valve 38 to be burned at the primary tip 30. As a result, fuel stagnation in the secondary manifold 32 is prevented by such pass through cooling flow provided by the SCF valve 22.

The fuel injection system 20 also incorporates a non-enriched nozzle assembly 26b. The non-enriched nozzle assembly 26b is essentially identical to enriched nozzle assembly 26a in that it also incorporates a secondary tip 28 and a primary tip 30. The secondary tip 28 receives metered fuel flow from a SCF valve 22 connected to the secondary manifold 32. As such, each of the enriched and non-enriched nozzle assemblies 26a, 26b are commonly connected to the fuel supply control system 24 through the secondary manifold 32. However, the primary tip 30 of the non-enriched nozzle assembly 26b receives metered fuel flow from the fuel supply control system 24 via a non-enriched primary manifold 36. A primary metering valve 38 is also responsible for metering fuel flow through the non-enriched primary manifold 36 to the primary tip 30.

Such a configuration allows for the independent and non-identical fuel flow supply to the primary tip 30 of the enriched nozzle assembly 26a and the primary tip 30 of the non-enriched nozzle assembly 26b. In a typical combustion chamber environment, multiple enriched nozzle assemblies 26a and multiple non-enriched nozzle assemblies 26b will be utilized. Due to the aforementioned independent connection of the primary tips of each of these respective nozzle assemblies, a non-uniform distribution of flow to the primary tips thereof is achieved which allows for greater control over combustion characteristics. It will be recognized that although only a single enriched nozzle assembly 26a and a single non-enriched nozzle assembly 26b are illustrated, a greater number of enriched and non-enriched nozzle assemblies 26a, 26b can be utilized in other embodiments.

The SCF valve 22 connected to the non-enriched nozzle assembly 26b also includes first and second valve members in the form of a cooling valve member 50 and a metering valve member 52. In the event that the metering valve member 52 is entirely closed, pass through flow from the secondary manifold 32 through the open cooling valve member 50 to the non-enriched primary manifold 36 is allowed. As such, and as was the case with the SCF valve 22 connected to the enriched nozzle assembly 26a, fuel stagnation is prevented in the secondary manifold by allowing pass through flow from the secondary manifold 32 to the non-enriched primary manifold 36 through the cooling valve member 50.

While the cooling valve member 50 is illustrated in FIG. 1 as being part of the SCF valve 22, other arrangements are contemplated as well. For instance, the cooling valve member 50 may be separated from the SCF valve 22 and still maintain the same functionality but as an independent structure.

Turning now to FIG. 2, having discussed the general environmental application of the SCF valve 22, the structural attributes of one embodiment of the SCF valve 22 will now be described in greater detail. The SCF valve 22 includes a housing 40. A manifold connector 42 is connected to an inlet flow path in fluid communication with an inlet 44 of the housing. The manifold connector 42 connects the SCF valve 22 to the secondary manifold 32 (see FIG. 1).

The housing 40 has two outlet ports, namely, a secondary tip port 46 for connecting the SCF valve 22 to the secondary tip 28 of an enriched or non-enriched nozzle assembly 26a, 26b, and a primary tip port 48 for connecting the SCF valve 22 to a primary tip 30 of an enriched or non-enriched nozzle assembly 26a, 26b (see FIG. 1). The housing 40 is shown as a generally cylindrical body for illustrative purposes only, and can take on various other shapes depending on particular design constraints and criteria. Similarly, the secondary manifold connector 42 illustrated generally, and can be embodied by various forms of connectors and thus is not limited to that which is shown at FIG. 2.

Turning now to FIG. 3, the internal components of the SCF valve 22 are shown in greater detail. As stated above, the SCF valve 22 includes a valve member arrangement formed by a cooling valve member 50 and a metering valve member 52. The cooling valve member 50 is responsible for allowing pass through flow from the secondary manifold 32 to the enriched or non-enriched primary manifold 34, 36 (see FIG. 1) in the event flow from the secondary manifold 32 through the SCF valve 22 to the secondary tip 28 is otherwise prevented. The metering valve member 52 is responsible for metering flow from the secondary manifold 32 to the secondary tip 28 of the enriched or non-enriched nozzle assembly 26a, 26b (see FIG. 1) connected thereto.

The cooling valve member 50 and metering valve member 52 are centered along a common centerline 54. The cooling valve member 50 and metering valve member 52 are each movable along the common centerline 54 relative to one another and relative to the housing 40. The cooling valve member 50 is generally cylindrical in shape and received within an internal bore 62 of the metering valve member 52. The cooling valve member 50 includes a pair of radial ports 102, 104 connected by way of an axially extending passageway 106 (see FIG. 4).

As such, a flow path through the cooling valve member 50 is defined between one radial port 102, the axially extending passageway 106, and the other radial port 104. As will be explained in greater detail below, this flow path is selectively opened and closed by axially sliding the cooling valve member 50 within the internal bore 62 of the metering valve member 52 to cover and uncover the aforementioned radial ports 102, 104 of the cooling valve member 50.

The metering valve member 52 is received within an internal bore 66 of a sleeve member 64 which surrounds the metering valve member 52. The metering valve member 52 is slideable within the sleeve member 64 to selectively open and close a flow path from the inlet 44 through radial ports 124 of the sleeve member 64. A cap member 74 surrounds a portion of the sleeve member 64 and receives the same within an internal bore 76 thereof. The cap member 74 also includes radial ports 126 that are aligned with the radial ports 124 of the cap member 74. When the movement of the metering valve member 52 is such that the flow from the inlet through the radial ports 124 of the sleeve member 64 is allowed, this same flow will pass through the radial ports 126 of the cap member 74. The radial ports 126 of the cap member 74 are aligned with the secondary tip port 46 of the housing 40.

Accordingly, the metering valve member 52 is operable to meter fuel flow from the inlet 44 to the secondary tip port 46 of the housing 40, and subsequently to the secondary tip 28 (see FIG. 1) of a nozzle assembly connected to the SCF valve 22. The cooling valve member 50 is movable within the internal bore 62 of the metering valve member 52 to allow pass through flow from the inlet to the primary tip port 48 of the housing 40 when the metering valve 52 prevents flow from the inlet 44 to the secondary tip port 46.

The aforementioned movement of the cooling valve member 50 and metering valve member 52 is counteracted by a first biasing spring 84 and a second biasing spring 94. More specifically, the first biasing spring 84 is positioned between an internal axial wall of the housing 40 (see FIG. 4) and a radially outwardly extending flange 82 of the metering valve member 52. The second biasing spring 94 is connected between the internal axial wall of the housing 40 (see FIG. 4) and a radially outwardly extending flange 92 of a stem element 90.

The stem element 90 extends into the internal bore 62 of the metering valve member 52 and a portion thereof is received within a blind hole 112 of the cooling valve member 50. Movement of the metering valve member 52 along the common centerline 54 acts to compress the first biasing spring 84. Likewise, movement of the cooling valve member 50 along the common centerline 54 causes the abutted contact between the cooling valve member 50 and the stem element 90 to ultimately compress the second biasing spring 94. Each of the first and second biasing springs 84, 94 act to return the cooling valve member 50 and metering valve member 52 to an equilibrium position once compressed.

Figure 4:
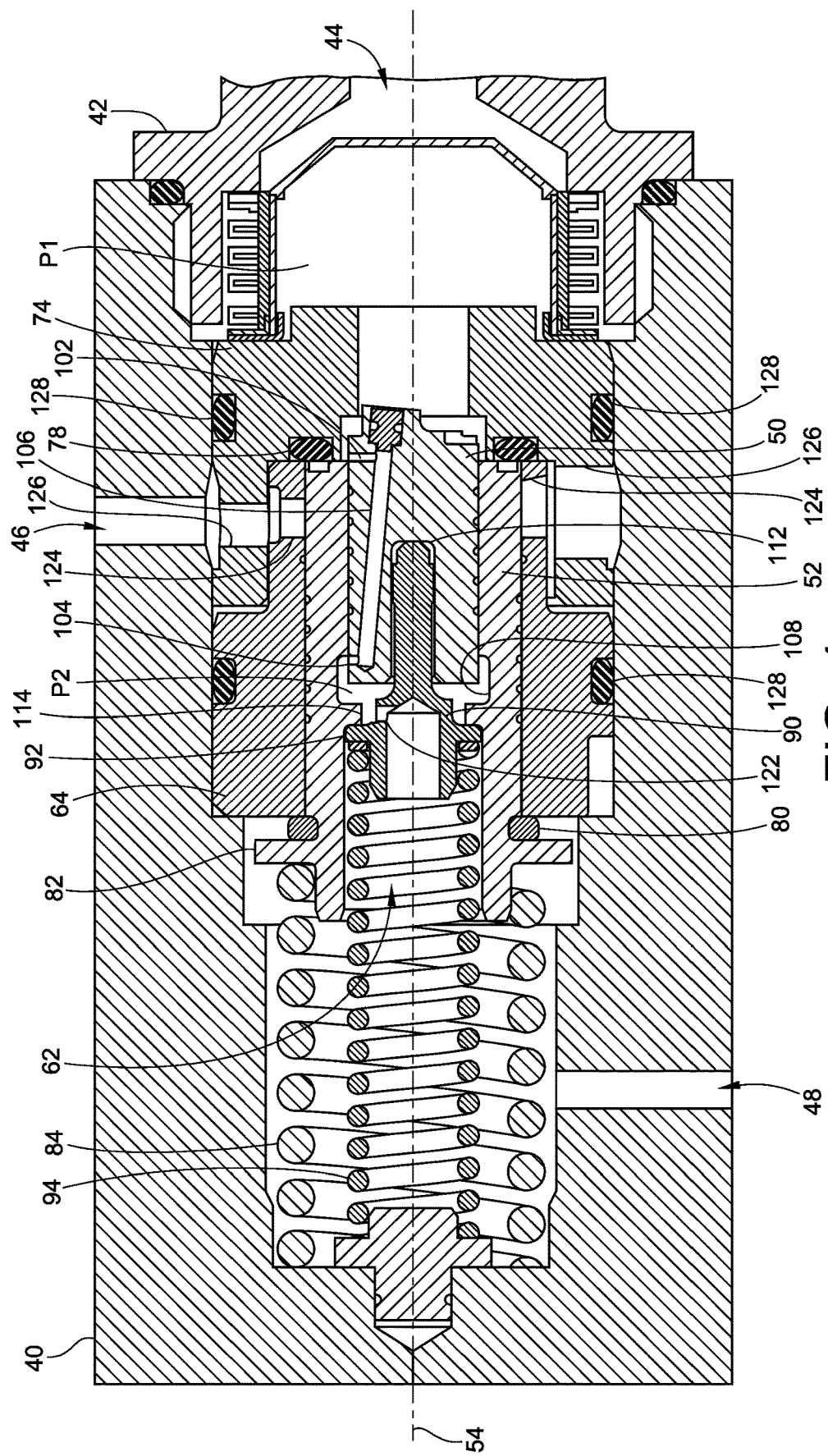
FIG. 4 is a side cross section of the split flow control valve of FIG. 2 in a cooling flow on configuration.

Turning now to FIG. 4, a cross-section of the SCF valve 22 is illustrated in a cooling flow configuration. In this configuration, flow from the inlet 44 to the secondary tip port 46 is prevented, however, flow from the inlet 44 to the primary tip port 48 is allowed. The fuel supplied from the secondary manifold 32 (see FIG. 1) to the inlet 44 is at a pressure P1. The primary tip port 48 is connected to either the enriched or non-enriched primary manifold 34, 36 (depending upon the particular nozzle assembly) and the pressure at this port is illustrated as pressure P2. This pressure P2 is sensed on the leftmost axial face of the cooling valve 50 illustrated at FIG. 4, whereas the pressure P1 at the inlet 44 is sensed on the rightmost axial face of the cooling valve member 50 illustrated at FIG. 4. The pressure differential P1 to P2 is such that the cooling valve member is in abutted contact with the stem 90. However, this pressure differential is not strong enough to cause continued movement from right to left in FIG. 4 of the cooling valve member 50 to compress the second biasing spring 94. As a result, the rightmost radial port 102 of the cooling valve member is exposed to fuel flow from the inlet 44. Likewise, the leftmost radial port 104 is also exposed, and thus flow from the rightmost radial port 102 of the cooling valve member 50 through the passageway 106 and to the leftmost radial port 104 of the cooling valve member 50 is allowed. Such flow passes through a radial port 122 formed in the stem 90. This flow then continues to the primary tip port 48.

The pressure differential P1 to P2 is insufficient to overcome the spring force provided by the first biasing spring 84 which biases the metering valve member 52 into axial abutment with a first axial face seal 78 carried by the cap member 74. As such, flow from the inlet 44 through the aligned ports 124, 126 and ultimately to the secondary tip port 46 is prevented. Each of the sleeve member 64 and cap member 74 also carry radial seals 128 which seal against the interior surface of the housing 40 so as to prevent a leak path from inlet to the primary tip port 46 and from the primary tip 48 to the secondary tip port 46. The second metering valve 52 also carries a second axial face seal 80 which prevents a leak path from the primary tip port 48 and between the outer periphery of the metering valve member 52 and the inner periphery of the sleeve member 64 to the secondary tip port 46.

The pressure differential P1 to P2 to achieve the configuration shown at FIG. 4 is about 15 psi to about 20 psi. However, it will be recognized that the selection of the first and second biasing springs 84, 94 will dictate the pressure differential required to allow flow from the inlet to the secondary tip port 46 and from the inlet 44 to the primary tip port 48. As such, other pressure differentials can achieve the configuration of FIG. 4 in other embodiments.

Figure 5:
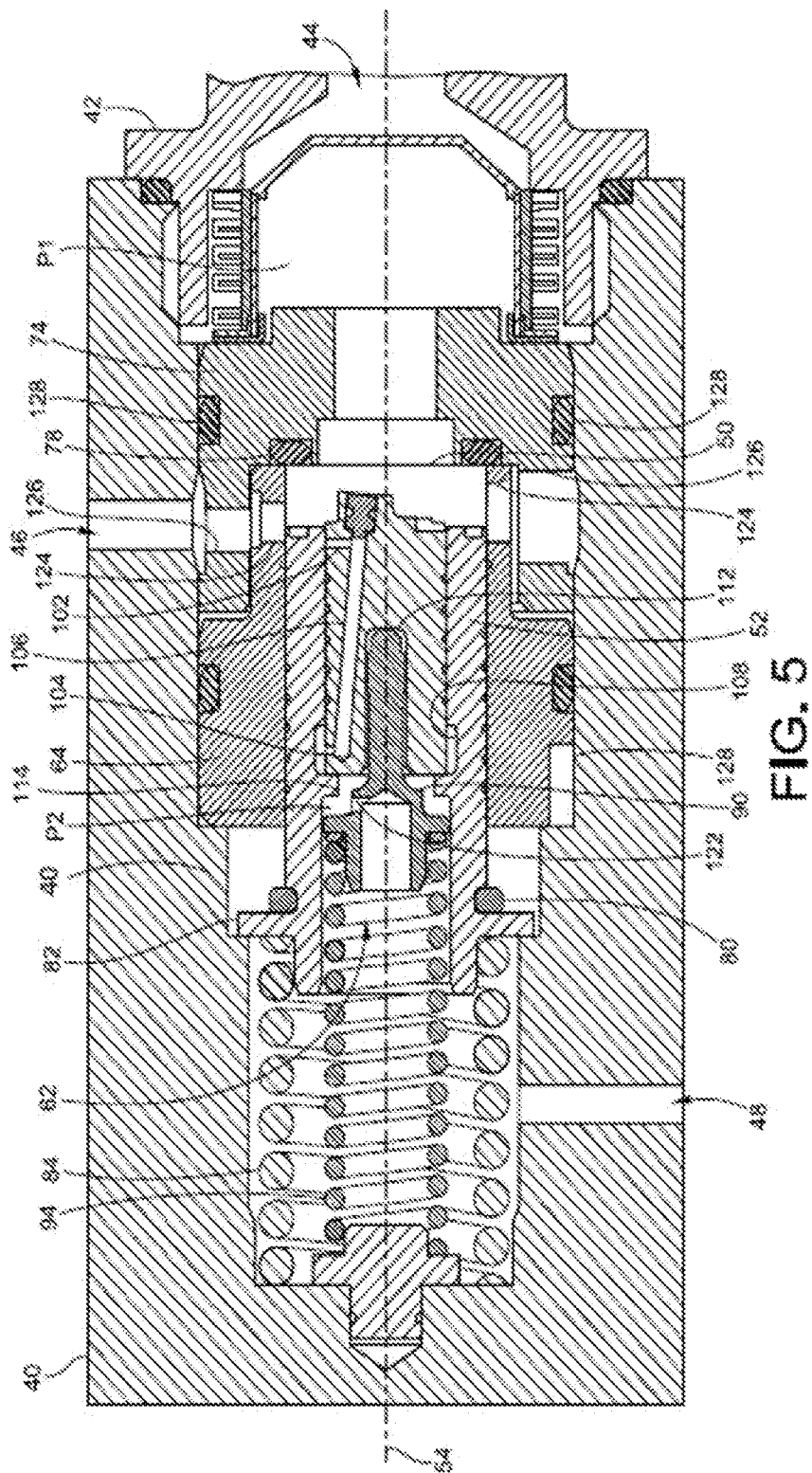
FIG. 5 is a side cross section of the split flow control valve of FIG. 2 in a high pressure cooling flow off configuration.

Turning now to FIG. 5, a cross-section of the SCF valve 22 is illustrated in a configuration wherein cooling flow through the cooling valve member 50 is closed but flow from the inlet 44 to the secondary tip port 46 is allowed. In this configuration, the pressure differential P1 to P2 is such that the cooling valve member has moved from the right to the left in FIG. 5 such that the leftmost axial face thereof abuts a radially inwardly extending flange 114 formed in the internal bore 62 of the metering valve member 52. Once abutted, the cooling valve member 50 biases the metering valve member 52 from right to left to compress the first biasing spring 84. The pressure differential P1 to P2 is also great enough to bias the cooling valve member 50 against the stem 90 to compress the second biasing spring 94.

Such movement of the cooling valve member 50 also places the cooling valve member 50 within the internal bore 62 of the metering valve member 52 such that the rightmost radial port 102 of the cooling valve member 50 is in sealing engagement with the peripheral surface 108 of the internal bore 62. As such, flow through the cooling valve member 50 is prevented.

However, the pressure differential P1 to P2 is great enough such that the metering valve member 52 has been biased by the cooling valve member 50 from right to left and away from the rightmost first axial face seal 78 carried by the cap member 74 such that the radial port 124 of the sleeve member 64 is exposed to fluid flow from the inlet 44. This fluid flow through the radial ports 124 of the sleeve member 64 also passes through the radial ports 126 of the cap member 74 and ultimately to the secondary tip port 46. As such, while pass through flow through the cooling valve member 50 is prevented, flow from the inlet 44 to the secondary tip port 46 is allowed.

The pressure differential required to achieve the configuration shown at FIG. 5 is about 35 psi to about 50 psi. However, it will be recognized that other pressure differentials P1 to P2 will also achieve the aforementioned configuration depending upon the selection of the first and second biasing springs 84, 94.

Additionally, it will be noted that the radial ports 124 formed in the sleeve member 64 are not uniform. Likewise, the port size of the radial ports 126 of the cap member 74 are also not uniform. Indeed, in the illustrated embodiment of FIG. 5, the uppermost ports 124, 126 are smaller than the lowermost ports 124, 126 in the illustrated cross-section. As such, as the metering valve member 52 moves from right to left, flow will first pass through the lowermost ports 124, 126. As the pressure differential P1 to P2 increases, and the cooling valve member 50 and metering valve member 52 continue to move from right to left, eventually the uppermost radial ports 124, 126 will also be exposed to flow in addition to the lowermost ports 124, 126. As such, the amount of flow from the inlet 44 to the secondary tip port 46 will increase as the cooling valve member 50 and metering valve member 52 move from right to left. Such a configuration allows for a variable range of metered flow from the inlet 44 to the secondary tip port 46, unlike the discrete flow levels of prior designs.

Figure 6:
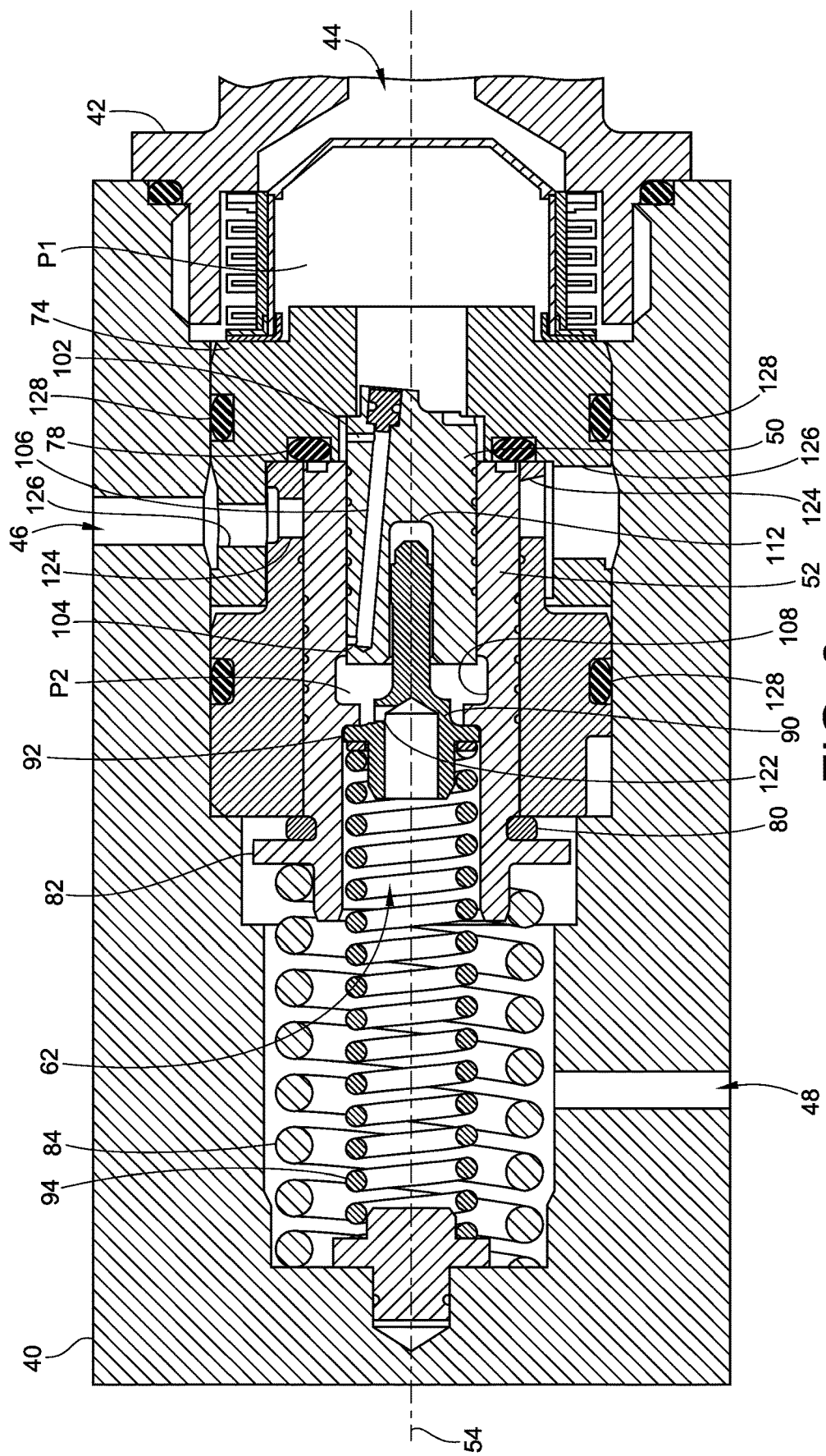
FIG. 6 is a side cross section of the split flow control valve of FIG. 2 in a low pressure cooling flow off configuration.

Turning now to FIG. 6, another configuration of the SCF valve 22 is illustrated. This configuration is specific to an SCF valve 22 incorporated in an enriched nozzle assembly 26a (see FIG. 1). In such a configuration flow from the inlet 44 to the secondary tip port 46 is prevented. Flow from the inlet 44 to the primary tip port 48 is also prevented. With momentary reference back to FIG. 1, the enriched and non-enriched nozzle assemblies 26a, 26b are commonly connected to the secondary manifold 32 but also each have an independent connection to the fuel supply control system 24 by way of the enriched primary manifold 34 and the non-enriched primary manifold 36, respectively. As such, when the SCF valve 22 of the enriched nozzle assembly 26a is in the configuration shown at FIG. 6, fuel stagnation in the secondary manifold 32 is nevertheless prevented because the SCF valve 22 incorporated in the non-enriched nozzle assembly 26b will be in the configuration shown at FIG. 5 to thus allow flow from the secondary manifold 32 through the inlet 44 and out to the secondary tip port 46.

Returning now to FIG. 6, the pressure P2 sensed from the primary tip port 48 is greater than the pressure P1 sensed at the inlet 44. As such, the cooling valve member 50 has moved from left to right in the cross-section shown at FIG. 6 such that the leftmost radial port 104 of the cooling valve member 50 is closed and sealed against the interior surface 108 of the internal bore 62 of the metering valve member 52. As such, flow through the cooling valve member 50 is prevented. Due to the aforementioned pressure differential, the metering valve member 52 resecondarys in sealing engagement with the first axial face seal 78 carried by the cap member 74 such that flow from the inlet 44 to the secondary tip port 46 is also prevented.

In the enriched nozzle assembly 26a (see FIG. 1) incorporating an SCF valve 22 shown in the configuration at FIG. 6, it will be recognized that there is no flow from the primary manifold 34 (see FIG. 1) through the SCF valve 22. As such, the enriched nozzle assembly 26a (see FIG. 1) will supply all fuel flow through the primary tip 30 as supplied by the enriched primary manifold 34. The SCF valve 22 of the remaining non-enriched nozzle assembly 26b (see FIG. 1) will be at a pressure differential P1 to P2 as illustrated at FIG. 4 to ensure that fuel flow through the secondary manifold 32 continues in order to avoid stagnation.

Figure 7:
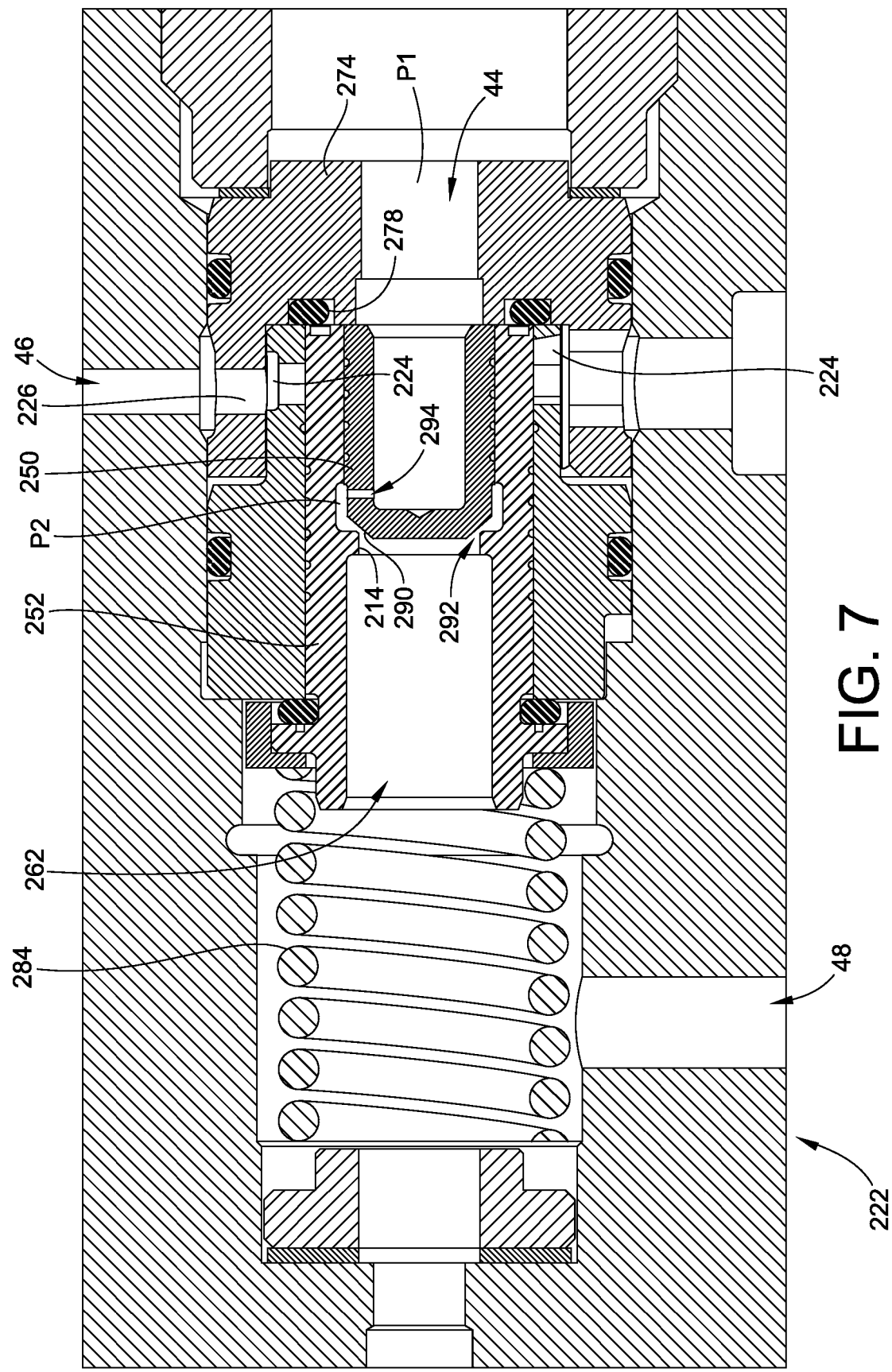
FIG. 7 is a side cross section of a cooling check valve in a cooling flow on configuration, according to an embodiment of the present invention.

Turning now to FIG. 7, a further embodiment of the present invention is illustrated in Cooling Check Valve (CCV) 222, which is a simplified version of the SCF valve 22. The CCV 222 is simplified from the SCF 22 in that cooling valve 250 is not biased by the spring 94. As such, the cooling valve 250 shuts off flow in only a single direction.

FIG. 7 illustrates a cross-section of the CCV valve 222 in a cooling flow configuration. In this configuration, flow from the inlet 44 to the secondary tip port 46 is prevented, however, flow from the inlet 44 to the primary tip port 48 is allowed. The fuel is supplied from the secondary manifold 32 (see FIG. 1) to the inlet 44 at a pressure P1. The primary tip port 48 is connected to either the enriched or non-enriched pilot manifold 34, 36 (depending upon the particular nozzle assembly) and the pressure at this port is illustrated as pressure P2. This pressure P2 is sensed on the left most axial face of the cooling valve 250, whereas the pressure P1 at the inlet 44 is sensed on the rightmost axial face of the cooling valve member 250.

In the configuration of the CCV 222 illustrated in FIG. 7, the pressure differential P1 to P2 is set by the fuel supply control system 24 (see FIG. 1) such that the right most face of the cooling valve 250 is in abutted contact with a cap member 274. In this configuration the pressure at P2 is greater than the pressure at P1. The pressure differential between P1 to P2 will not act against the spring force provided by a biasing spring 284, because the biasing spring 284 biases a rightmost face of the metering valve member 252 into a rightmost first axial face seal 278 that is carried in the cap member 274. The cooling valve 250 is sized such that an annular gap 292 is formed between a radially inward extending flange 214 and an annular groove 290 of the cooling valve 250. This annular gap 292 opens a flow passage between the inlet 44 and the primary tip port 48 through a flow port 294 of the cooling valve 250. Further, the annular gap 292 provides a flow area such that the flow port 294 is the dominate restriction in the flow path from the primary tip port 48 to the inlet 44.

Figure 8:
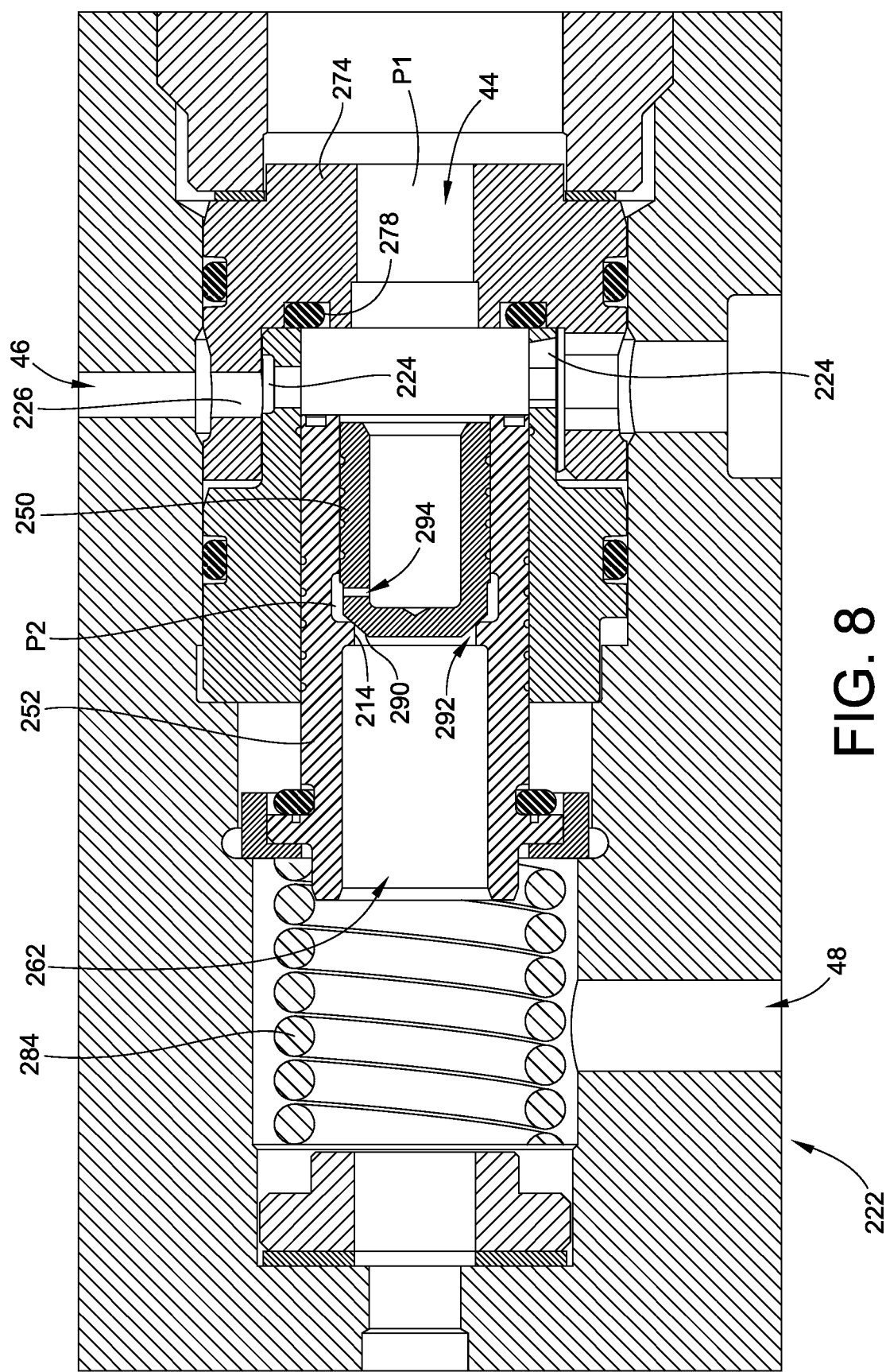
FIG. 8 is a side cross section of a cooling check valve of FIG. 7 in a cooling flow off configuration.

Turning now to FIG. 8, a cross section of the CCV 222 is illustrated in a configuration wherein cooling flow is closed but flow from the inlet 44 to the secondary tip 46 is allowed.

In this configuration, the pressure differential P1 to P2 is such that the cooling valve member 250 has moved from the right to the left such that the annular groove 290 of the cooling valve member 250 abuts the radially inwardly extending flange 214 formed by the metering valve member 252. In this configuration the pressure P1 is greater than the pressure P2. Once abutted, the cooling valve member 250 biases the metering valve member 252 from right to left to compress the biasing spring 284.

Further, the pressure differential P1 to P2 is great enough such that the metering valve member 252 has been biased by the cooling valve member 250 from right to left and away from the rightmost first axial face seal 278 carried by the cap member 274 such that the radial port 224 is exposed to fluid flow from the inlet 44. This fluid flow through the radial ports 224 also passes through the radial ports 226 of the cap member 274 and ultimately to the secondary tip port 46. As such, flow from the inlet 44 to the secondary tip port 46 is allowed.

Additionally, it will be noted that the radial ports 224 are not uniform. Likewise, the port size of the radial ports 226 of the cap member 274 are also not uniform. Indeed, in the illustrated embodiment of FIG. 8, the uppermost ports 224, 226 are smaller than the lower most ports 224, 226 in the illustrated cross-section. As such, as the metering valve member 252 moves from right to left, flow will first pass through the lower most ports 224, 226. As the pressure differential P1 to P2 increases, and the cooling valve member 250 and metering valve member 252 continue to move from right to left, eventually the uppermost radial ports 224, 226 will also be exposed to flow in addition to the lowermost ports 224, 226. As such, the amount of flow from the inlet 44 to the secondary tip port 46 will increase as the cooling valve member 250 and metering valve member 252 move from right to left. Such a configuration allows for a variable range of metered flow from the inlet 44 to the main tip port 46, unlike the discrete flow levels of prior designs.

As described herein, the embodiment of the SCF valve 22 and the CCV 222 advantageously allows for split flow between the secondary tip 28 and primary tip 30 of a nozzle assembly 26a, 26b. Such fuel splitting is done via the single valve arrangement presented by the SCF valve 22 or CCV 222. Additionally, the SCF valve 22 or CCV 222 overcomes existing problems with prior designs by allowing for variable fuel flow split between the secondary tip 28 and primary tip 30 as opposed to predefined discrete fuel flow split levels.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A control valve for regulating fuel flow between a primary tip and a secondary tip of an injection nozzle, the control valve comprising:
   an inlet flow path;
   a primary flow path operably coupled to the inlet flow path;
   a secondary flow path operably coupled to the inlet flow path and the primary flow path;
   a first valve member movable to selectively open and close a passage between the inlet flow path and the secondary flow path; and
   a second valve member movable to selectively open and close a passage between the inlet flow path and the primary flow path;
   further comprising:
   a housing having an internal cavity and an inlet in fluid communication with the inlet flow path, a secondary tip port in fluid communication with the secondary flow path, and a primary tip port in fluid communication with the primary flow path, each of the inlet, the secondary tip port, and the primary tip port being in fluid communication with the internal cavity;
   wherein the first valve member includes an internal bore, the first valve member slidably disposed within the internal cavity and movable to selectively open and close a flow path between the inlet and the secondary tip port;
   wherein the second valve member is slidably disposed within the internal bore of the first valve member, the second valve member movable to selectively open and close a flow path between the inlet and the primary tip port; and
   further comprising a stem extending into the internal bore of the first valve member and extending into abutted contact with the second valve member, wherein the stem includes a radially outwardly extending flange, and the first valve member includes a radially inwardly extending flange within the internal bore thereof, the radially inwardly extending flange having first and second surfaces in an axially opposed spaced relationship, the first surface facing the radially outwardly extending flange of the stem, the second surface facing the second valve member.

2. The control valve of claim 1, wherein the second valve member has a high pressure closed position wherein the flow path between the inlet and the primary tip port is closed and wherein the second valve member is in abutted contact with the stem and the radially outwardly extending flange of the stem is spaced away from the first surface of the radially inwardly extending flange.

3. The control valve of claim 1, wherein the second valve member has a low pressure closed position wherein the flow path between the inlet and the primary tip port is closed and wherein the second valve member is spaced away from a terminal end of the stem and the stem is in abutted contact with the first surface.

4. A control valve for regulating fuel flow between a primary tip and a secondary tip of an injection nozzle, the control valve comprising:
   an inlet flow path;
   a primary flow path operably coupled to the inlet flow path;
   a secondary flow path operably coupled to the inlet flow path and the primary flow path;
   a first valve member movable to selectively open and close a passage between the inlet flow path and the secondary flow path; and
   a second valve member movable to selectively open and close a passage between the inlet flow path and the primary flow path;
   further comprising:
   a housing having an internal cavity and an inlet in fluid communication with the inlet flow path, a secondary tip port in fluid communication with the secondary flow path, and a primary tip port in fluid communication with the primary flow path, each of the inlet, the secondary tip port, and the primary tip port being in fluid communication with the internal cavity;
   wherein the first valve member includes an internal bore, the first valve member slidably disposed within the internal cavity and movable to selectively open and close a flow path between the inlet and the secondary tip port;
   wherein the second valve member is slidably disposed within the internal bore of the first valve member, the second valve member movable to selectively open and close a flow path between the inlet and the primary tip port; and
   wherein the second valve member includes first and second radial ports connected by a common passageway, wherein the first radial port is closed by the first valve member when the second valve member moves in a first direction relative to the first valve member, and wherein the second radial port is closed by the first valve member when the second valve member moves in a second direction opposite the first direction.

5. A control valve for regulating fuel flow between a primary tip and a secondary tip of an injection nozzle, the control valve comprising:
   an inlet flow path;
   a primary flow path operably coupled to the inlet flow path;
   a secondary flow path operably coupled to the inlet flow path and the primary flow path;
   a first valve member movable to selectively open and close a passage between the inlet flow path and the secondary flow path; and
   a second valve member movable to selectively open and close a passage between the inlet flow path and the primary flow path;
   further comprising:
   a housing having an internal cavity and an inlet in fluid communication with the inlet flow path, a secondary tip port in fluid communication with the secondary flow path, and a primary tip port in fluid communication with the primary flow path, each of the inlet, the secondary tip port, and the primary tip port being in fluid communication with the internal cavity;
   wherein the first valve member includes an internal bore, the first valve member slidably disposed within the internal cavity and movable to selectively open and close a flow path between the inlet and the secondary tip port;
   wherein the second valve member is slidably disposed within the internal bore of the first valve member, the second valve member movable to selectively open and close a flow path between the inlet and the primary tip port; and
   further comprising a sleeve surrounding the first and second valve members and including a radial port aligned with the secondary tip port.

6. The control valve of claim 5, wherein the sleeve and first valve member each commonly seal with a first axial face seal, and wherein the first valve member is movable out of sealing engagement with the first axial face seal.

7. A staged cooling flow control valve for regulating fuel flow between a primary tip and a secondary tip of an injection nozzle, the staged cooling flow control valve comprising:
   a housing having an internal cavity and an inlet, a secondary tip port, and a primary tip port in fluid communication with the internal cavity;
   a first valve member disposed within the internal cavity and movable to selectively open a flow path between the inlet and the secondary tip port at a first pressure differential between the inlet and the primary tip port; and
   a second valve member disposed within the internal cavity and movable to selectively open a flow path between the inlet and the primary tip port at a second pressure differential between the inlet and the primary tip port, the second pressure differential less than the first pressure differential.

8. A staged cooling flow control valve for regulating fuel flow between a primary tip and a secondary tip of an injection nozzle, the staged cooling flow control valve comprising:
   a housing having an internal cavity and an inlet, a secondary tip port, and a primary tip port in fluid communication with the internal cavity;
   a first valve member disposed within the internal cavity and movable to selectively open a flow path between the inlet and the secondary tip port at a first pressure differential between the inlet and the primary tip port;
   a second valve member disposed within the internal cavity and movable to selectively open a flow path between the inlet and the primary tip port at a second pressure differential between the inlet and the primary tip port, the second pressure differential less than the first pressure differential; and
   wherein the second valve member is movable in a first direction to selectively close the flow path between the inlet and the primary tip port at a third pressure differential between the inlet and the primary tip port, the third pressure differential less than the first and second pressure differentials.

9. The staged cooling flow control valve of claim 8, wherein the first and second valve members move in a second direction to open the flow path between the inlet and the secondary tip port and close the flow path between the inlet and the primary tip port at the first pressure differential, the second direction opposite the first direction.

10. The staged cooling flow control valve of claim 8, wherein movement of the first valve member in the first direction is resisted by a first and a second biasing spring, the first biasing spring is operably connected between an interior wall of the housing and the first valve member, and the second biasing spring is operably connected between the interior wall of the housing and the second valve member.

11. A cooling check valve for regulating fuel flow between a primary tip and a secondary tip of an injection nozzle, the cooling check valve comprising:
   an inlet flow path;
   a primary flow path operably coupled to the inlet flow path;
   a secondary flow path operably coupled to the inlet flow path and the primary flow path;
   a metering valve member movable to selectively open a passage between the inlet flow path and the secondary flow path when a first pressure is greater in the inlet flow path than a second pressure in the primary flow path; and
   a cooling valve member movable to selectively open a passage between the inlet flow path and the primary flow path when the second pressure is greater than the first pressure.

12. The cooling check valve of claim 11, wherein the metering valve member and the cooling valve member are arranged in parallel.

13. A cooling check valve for regulating fuel flow between a primary tip and a secondary tip of an injection nozzle, the cooling check valve comprising:
   an inlet flow path;
   a primary flow path operably coupled to the inlet flow path;
   a secondary flow path operably coupled to the inlet flow path and the primary flow path;
   a metering valve member movable to selectively open a passage between the inlet flow path and the secondary flow path when a first pressure is greater in the inlet flow path than a second pressure in the primary flow path;
   a cooling valve member movable to selectively open a passage between the inlet flow path and the primary flow path when the second pressure is greater than the first pressure;
   a housing having an internal cavity and an inlet port in fluid communication with the inlet flow path, a secondary tip port in fluid communication with the secondary flow path, and a primary tip port in fluid communication with the primary flow path, each of the inlet port, the secondary tip port, and the primary tip port being in fluid communication with the cavity;
   wherein the metering valve member is disposed within the cavity and movable to selectively open a flow path between the inlet port and the secondary tip port when the first pressure is greater than the second pressure; and
   wherein the cooling valve member is disposed within the cavity and movable to selectively open a flow path between the inlet port and the primary tip port when the second pressure is greater than the first pressure.

14. The cooling check valve of claim 13, wherein the cooling valve member and the metering valve member are movable in a first direction to selectively close the flow path between the inlet and the primary tip port and open the flow path between the inlet and the secondary tip port when the first pressure is greater than the second pressure.

15. The cooling check valve of claim 14, wherein the metering valve member includes a radially inward extending flange that abuts the cooling valve member to form a seal when the first pressure is greater than the second pressure.

16. The cooling check valve of claim 14, wherein movement of the metering valve member in the first direction is resisted by a biasing spring, the biasing spring is operably connected between an interior wall of the housing and the metering valve member.

17. The cooling check valve of claim 13, wherein the cooling valve member and the metering valve member are movable in a second direction to selectively close the flow path between the inlet and the secondary tip port and open the flow path between the inlet and the primary tip port when the second pressure is greater than the first pressure.

18. The cooling check valve of claim 13, wherein the metering valve member and the cooling valve member are coaxial.

19. The cooling check valve of claim 13, wherein the cooling valve member includes a flow port that allows flow to pass through when the flow from the inlet to the primary tip port is open.

20. A staged cooling flow control valve for regulating fuel flow between a primary tip and a secondary tip of an injection nozzle, the staged cooling flow control valve comprising:
   a housing having an internal cavity and an inlet, a secondary tip port, and a primary tip port in fluid communication with the internal cavity;
   a first valve member disposed within the internal cavity and movable to selectively open a flow path between the inlet and the secondary tip port at a first pressure differential between the inlet and the primary tip port; and
   a second valve member disposed within the internal cavity and movable to selectively open a flow path between the inlet and the primary tip port at a second pressure differential between the inlet and the primary tip port, the second pressure differential less than the first pressure differential;
   wherein the flow path between the inlet and the primary tip port is closed when the flow path between the inlet and the secondary tip port is open.

21. A cooling check valve for regulating fuel flow between a primary tip and a secondary tip of an injection nozzle, the cooling check valve comprising:
   an inlet flow path;
   a primary flow path operably coupled to the inlet flow path;
   a secondary flow path operably coupled to the inlet flow path and the primary flow path;
   a metering valve member movable to selectively open a passage between the inlet flow path and the secondary flow path when a first pressure is greater in the inlet flow path than a second pressure in the primary flow path; and
   a cooling valve member movable to selectively open a passage between the inlet flow path and the primary flow path when the second pressure is greater than the first pressure;
   wherein the passage between the inlet flow path and the primary flow path is closed when the passage between inlet flow path and the secondary flow path is open.

* * * * *